United States Patent [19]

Sachtler et al.

[11] Patent Number: 4,654,317

[45] Date of Patent: Mar. 31, 1987

[54] DISPERSION ENHANCED METAL/ZEOLITE CATALYSTS

[75] Inventors: Wolfgang M. H. Sachtler; Ming-Shin Tzou; Hui-Jong Jiang, all of Evanston, Ill.

[73] Assignee: Northwestern University, Evanston, Ill.

[21] Appl. No.: 752,138

[22] Filed: Jul. 3, 1985

[51] Int. Cl.[4] ............................................. B01J 29/10
[52] U.S. Cl. ........................................................ 502/74
[58] Field of Search ................................ 502/66, 74, 79

[56] References Cited

U.S. PATENT DOCUMENTS

| | | | |
|---|---|---|---|
| 3,226,339 | 12/1965 | Frilette et al. | 502/74 |
| 3,334,132 | 8/1967 | Landis | 502/79 X |
| 3,342,725 | 9/1967 | Young | 502/74 X |
| 3,364,135 | 1/1968 | Hansford | 502/79 X |
| 3,654,185 | 4/1972 | Berry | 502/74 |

OTHER PUBLICATIONS

Huizinga and Prins, J. Phys. Chem. (1983), 87:173–176.
Yermakov, Catal., Rev. Sci–Eng. (1976), 13:77–120.
Exner et al., Chemie–Ing. Techn. (1980), 52:734–736.

*Primary Examiner*—Carl F. Dees
*Attorney, Agent, or Firm*—Tilton, Fallon, Lungmus & Chestnut

[57] ABSTRACT

Dispersion stabilized zeolite supported metal catalysts are provided as bimetallic catalyst combinations. The catalyst metal is in a reduced zero valent form while the dispersion stabilizer metal is in an unreduced ionic form. Representative catalysts are prepared from platinum or nickel as the catalyst metal and iron or chromium dispersion stabilizer.

10 Claims, No Drawings

DISPERSION ENHANCED METAL/ZEOLITE CATALYSTS

GRANT REFERENCE

This invention was made with Government support under Contract No. DE-ACO2-84ER13157 awarded by The Department of Energy. The Government has certain rights in this invention.

FIELD OF INVENTION, BACKGROUND AND PRIOR ART

The general field of this invention is metal/zeolite catalysts. The invention is particularly concerned with catalysts which are formed by exchanging a Group VIII metal, such as platinum or nickel, onto zeolite, the highly dispersed form of the metal thus obtained being subsequently reduced to a zero valent catalytic state.

Catalysts formed from dispersions of catalytic metals in zeolite supports have not been used as extensively as other catalysts for commercial purposes. Preferred catalytic supports for metals such as platinum and nickel or bimetallic combinations thereof have been alumina ($Al_2O_3$) or silica ($SiO_2$). Dispersions of catalytic metal on alumina or silica have been found to be much more stable in use than zeolite-supported catalysts. Under elevated temperature conditions as commonly encountered in the use of such catalysts, metal particles tend to migrate in the zeolite support, coalesce, and aggregate into larger particles with consequent loss of catalytic activity. See Imelik et al., "Catalysis by Zeolites," (1980, Elsevier, Amsterdam), pp. 235-249.

Since the first study of Pt supported in a calcium Y-type zeolite (CaY) by Rabo et al., *Proc. 3rd Intern. Congr. Catal.* (Amsterdam, 1964) 2:1264, metal-containing zeolites have been extensively studied. Most research has been done with Group VIII noble metals. The amine complexes of these cations are usually exchanged into the zeolites and reduced by $H_2$. As an intermediate step, the amine complex may be treated in an oxydative atmosphere prior to the reduction with $H_2$. It has been suggested that a low temperature (e.g. 300° C.) for the metal reduction may be necessary to obtain highly dispersed metal particles entrapped in zeolite cavities. Dalla Betta, et al., *5th Intern. Congr. Catal.* (Miami Beach, 1972) 1:329.

If metal ions on zeolite are reduced at high temperature, large metal particles may be formed having reduced catalytic activity. Even the highly dispersed metal obtained by low temperature reduction still tends to agglomerate to larger metal aggregates during use. The difficulties in obtaining and maintaining particle dispersions are indicative of a weak interaction of the metal particles with the zeolite framework. See Mortier, *Proc. 6th Intern. Zeolite Conf.* (Reno, 1983), Butterworths (1984), p. 734. Indeed it has been shown from molecular model calculations that the interaction is due only to weak van der Waals' forces. Sawr et al., *Structure and Reactivity of Modified Zeolites* (Elsevier, Amsterdam, 1984), p. 313.

It has been hypothesized that on alumina som catalytic metal remains in unreduced form, which may serve to anchor the reduced catalytically active metal. Huzinga and Prins, *J. Phys. Chem.* (1983), 87:173-176. However, in later work these authors did not find evidence confirming their earlier hypothesis. (Koningsberger et al., *8th Intern. Congr. Catal.* (Berlin, 1984), V, 123).

Bimetal catalyst combinations on alumina and silica have been studied. Yermakov, *Catal., Rev. Sci-Eng.* (1976), 13:77-120. Improved catalyst stability was observed for platinum-rhenium-alumina and platinum-molybdenum-(or tungsten) silica. With reference to a $Pt-Re-Al_2O_3$ catalyst, Yermakov assumed that only the the platinum was reduced, and that unreduced rhenium ions on the surfaces of the alumina support, in effect, provided anchors for the platinum.

Dispersing effects of metal ions in zeolite supported catalysts have been suggested. Exner et al., *Chemie-Ing. Techn.* (1980), 52:734-736. By comparing an iron-free synthetic zeolite with natural zeolite containing trace amounts of the iron impurity, it was concluded that the dispersion of platinum was improved by the presence of the iron impurity.

SUMMARY OF INVENTION

This invention is based on the discovery that the addition of a second metal in ionic form in the preparation of metal zeolite catalysts can have marked effects in improving the initial dispersion of the reduced catalyst metal, and also in maintaining a highly-dispersed state of the reduced catalyst metal during use. In accordance with the present invention, a second metal is selected which is an appreciably greater reduction potential than the catalyst metal. The atomic ratio of the second metal ions to the catalyst metal is of importance for maximizing the dispersing/stabilizing effects. For example, in preparing platinum catalysts on Y-type zeolites, the dispersal of the Pt increases rapidly in the range from 0.2 to 1.0 atoms of the added metal ions per atom of catalyst metal.

The invention is applicable to both natural and synthetic zeolites for supporting Group VIII catalyst metals, such as platinum, nickel, etc. The dispersion stabilizer metal may be a transition metal such as iron or chromium. The added metal should remain in unreduced ionic form when the catalytic metal is reduced to zero valent form.

In addition to its function as a dispersion stabilizer, the second metal can be selected to also provide promoter activity. For example, added iron appears to promote the catalytic activity of platinum to a greater extent than can be accounted for by the improved dispersion of the platinum. As can be appreciated, therefore, the present invention has wide applicability in the preparation of metal zeolite catalysts.

The theoretical explanation for this invention has not been fully elucidated. However, the following mechanism is believed to be involved. When the catalyst metal is exchanged onto the zeolite, initially a very high degree of dispersion is obtained. Individual ions are localized at the cation exchange sites of the zeolite, which are located in cavities and channels of the zeolite. When these metal ions are reduced to a zero valent state, the ionic bonding is neutralized. Then the reduced metal atoms are bound to the zeolite by a weak interaction. This contrasts with the stronger metal support interactions on catalyst supports such as alumina. Therefore, either during the reduction step or subsequently in use, the reduced catalyst metal is subject to migration within the passages of the zeolite.

Prior to the present invention it was not known to what extent the migration of catalyst metals in zeolite could be influenced by providing ions of a second metal associated with ion exchange sites of the zeolite. The experimental work leading to the present invention demonstrated that such unreduced ions which have been exchanged into the zeolite can have an effect of large magnitude in maintaining the dispersion of the catalyst metal.

Apparently the unreduced metal ions function in effect as chemical anchors for the catalyst metal. It can be further postulated that reduced atoms of the catalyst metal may form small clusters with the anchoring metal ions. When a sufficient concentration of the unreduced ions are present throughout the zeolite, the catalyst metal atoms may be caught at an early stage in their migration from the ion exchange sites.

The anchoring ions and the catalytic metal both have incompletely filled d- or f-orbitals. An attractive interaction between the catalyst atom and the anchor ion is especially possible. The energy of the lowest occupied orbital of one metal atom can be similar to that of the highest occupied orbital of the metal ion. The geometry involved should permit good overlap of the corresponding orbitals for providing an attractive interaction.

DETAILED DESCRIPTION

This invention is believed to be generally applicable to zeolite catalyst supports. The usable class of zeolites is broad, including both natural and synthetic zeolites. Zeolites are crystalline aluminosilicates which contain exchangeable metal ions bound at ion exchange sites distributed throughout the porous framework of the zeolites. The exchangeable metals are commonly alkali or alkaline earth metals, viz. sodium or calcium. Zeolites may also contain trace amounts of metals which are bound within the matrix of the zeolite and which are not exchangeable.

Zeolites which have particular importance as catalyst supports include offretite, A-type zeolites, faujasite, X-type zeolites, Y-type zeolites, mordenite, and the synthetic zeolite known as ZSM-5. Y zeolites are believed to be particularly important. However, any zeolite can be employed of the kind permitting the metals to be exchanged onto the zeolite. For catalytic support purposes, such zeolites are in the form of porous granules. The size of such granules is not critical, but typically ranges from about 1 to 100 microns.

The catalyst ions are typically Group VIII metal ions. Such metals include platinum, palladium, nickel, cobalt, rhodium, and iridium. These catalyst metals may be employed individually or in combinations. Typically, a single catalyst metal will be employed together with a single dispersion stabilizer metal. However, combinations of stabilizer metals can be used.

The stabilizer metals are preferably transition metals or rare earth metal ions (viz. a lanthanide) which are selected in relation to the catalyst metal to have a substantially greater reduction potential that is a more negative reduction potential. Depending on the catalyst metal, the stabilizer metal ions may be selected from iron, chromium, manganese, vanadium, titanium, thorium, neodymium, cesium, lanthanum, yttrium, or cerium. The following illustrative values for reduction potentials are from "CRC Handbook of Chemistry and Physics," 64th Ed., 1983-84, pp. D156-163.

| Metal Ion | Volts[1] |
| --- | --- |
| Reduction Potentials of Catalyst Metals | |
| $Co^{2+}$ | −0.28 |
| $Ni^{2+}$ | −0.23 |
| $Rh^{3+}$ | +0.44 |
| $Pd^{2+}$ | +0.83 |
| $Ir^{3+}$ | +0.77 |
| $Pt^{2+}$ | +1.20 |
| Reduction Potentials of Stabilizing Metal Ions | |
| $Fe^{2+}$ | −0.41 |
| $Cr^{2+}$ | −0.557 |
| $Mn^{2+}$ | −1.03 |
| $V^{2+}$ | −1.20 |
| $Ti^{2+}$ | −1.63 |
| $Th^{4+}$ | −1.90 |
| $Nd^{3+}$ | −2.246 |
| $Ce^{3+}$ | −2.335 |
| $La^{3+}$ | −2.37 |
| $Y^{3+}$ | −2.37 |

[1]Value for reduction to zero valent state.

To achieve the desired reduction of the catalyst metal while leaving the stabilizing metal in ionic form, it will be recognized that the reduction potential of the stabilizing metal ions should be greater so that the catalyst metal ions are more readily reducible. Where the difference in reduction potential is as great as 0.4 to 0.5 volts, it can be expected that the selective reduction of the catalyst metal can be achieved without difficulty. However, perfect selectivity is not required. As a workable standard, satisfactory results can be envisioned where at least 90% of the catalyst metal is reduced to a zero valent state while at least 90% of the stabilizing metal remains in the ionic state. By careful control of reducing conditions, reduction potential differentials of as little as 0.2–0.3 volts can be employed.

Although the invention has general applicability as described above, certain embodiments are believed to have particular importance for commercial applications. Catalyst metals of special interest include particularly platinum and nickel. These metals are preferably employed in combination with either iron or chromium. However, many other combinations of catalyst metals and stabilizing metals can be utilized pursuant to the principles of this invention.

To achieve the benefits of the present invention, it is important to employ a sufficient amount of the stabilizer metal ions (Ms) in relation to the catalyst metal (Mc). The atomic ratio of the stabilizing metal ions to the catalyst metal should equal at least to 0.2, preferably at least 0.5, and up to at least 5.0. Based on presently-available data a preferred ratio is from about 0.5 to 1.5 Ms/Mc. However, larger ratios of the anchor metal can be used without disadvantage. Since catalysts are ordinarily prepared at low concentrations of the catalyst metal, it would be feasible to employ Ms/Mc ratios of 5 to 10 or more.

In preparing the catalyst, the metal ions are exchanged onto the zeolite support from an aqueous solution. Water-soluble salts of the metals may therefore be employed. Preferably, the salts are ones which decompose under heat with the evolution of a gas leaving the metals in ionic form on the ion exchange sites of the zeolite. For example, the catalyst and stabilizing metals may be applied in the form of water-soluble chloride or nitrate salts. One preferred form for certain metals is their amine chloride complexes. For example, platinum may be exchanged from a solution of $Pt(NH_3)_4Cl_2$, or alternatively from $Pt(NO_3)_2$. The concentrations of the aqueous solutions are not critical. Illustrative molar concentrations range from 50ppm to 2000ppm.

The amount of the catalyst metal to be exchanged can be first determined. Catalyst metal concentrations on the support are ordinarily expressed as weight percentages. On this basis, the molar amount of the catalyst metal to obtain a loading of from 0.1 to 4% may be selected. Typically from about 0.5 to 1% of the catalyst metal based on the final weight of the prepared catalyst will be used. The required amount of the stabilizing metal to provide the desired molar ratio (Ms/Mc) is also exchanged onto the catalyst. Stated generally, a catalytically-effective amount of the catalyst metal is employed together with an amount of the second metal ions providing effective dispersion stabilization.

No special techniques are required for carrying out the ion exchange. The granules of the zeolite can be slurried in the aqueous solutions of the metal salts. The metal ions may be applied from the same solution or from different solutions. The catalyst metal and the stabilizer metal ions will exchange for ions present in the zeolite such as sodium or calcium ions. Both metals will initially be distributed as ions localized at ion exchange sites of the zeolite and thereby highly dispersed.

While the catalyst metal ions exchanged onto the zeolite can be reduced directly from the ionic state in which they are applied, it is believed desirable to first subject the ions to an oxidizing step. For example, the zeolite granules containing the metal ions may be heated in an oxidizing gas, such air or oxygen ($O_2$) at oxidizing temperatures up to 360° C. for from 11 to 18 hours. Higher temperatures (viz. up to 550° C.) may also be employed where required to promote the oxidation.

Following the oxidation treatment, the catalyst is subjected to reducing conditions which are controlled so as to reduce the catalytic metal to a zero valent form while leaving the stabilizer metal in an unreduced ionic form. Typical conditions for the reducing steps involve passing a stream of hydrogen ($H_2$) gas through the zeolite granules at a temperature of from 360° to 550° C. for 1 to 5 hours.

The scientific basis for the present invention and its practical application are further illustrated by the following experimental examples.

EXPERIMENTAL EXAMPLES $FeSO_4.7H_2O$ in degassed deionized water was added slowly into a well stirred NaY zeolite/deionized water suspension (1 g/100 ml), which was previously acidified to pH 3.90 by diluted $H_2SO_4$[7]. Both reagents were flushed with argon gas during the entire duration of the exchanging process. The zeolite was then filtered off, washed with deionized water and dehydrated in vacuum for 24 h. A 0.01 M $PT(NH_3)_4Cl_2$ solution was added slowly to the suspension of the FeNaY in deionized water (1g100 ml) The bimetallic Pt/FeNaY containing $NH_3$ was separated from the solution by filtering and was washed until no $Cl^-$ was detectable. The metal loading of six Pt/FeNaY samples is in the range of 0.07 wt % to 2.92 wt % for Fe and 7 wt % to 9 wt % for Pt (see Table A). Sample No. 1 contained no added iron, the 0.07% being the trace amount of iron present in the zeolite. To accentuate comparative differences these loadings used were much higher than those which would normally be employed for commercial catalysts. There were about 5 to 6 Pt atoms in each unit cell. The iron content was in the range of 0.16 to 7.0 Fe atoms per unit cell.

TABLE A

| | Metal Loading of Pt/FeNaY Samples | | |
|---|---|---|---|
| Sample No. | Fe wt % | Pt wt % | Fe/Pt atomic ratio |
| 1 | 0.07[1] | 7.40 | 0.031 |
| 2 | 0.20[2] | 9.19 | 0.077 |
| 3 | 0.82 | 8.45 | 0.34 |
| 4 | 1.14 | 7.68 | 0.51 |
| 5 | 1.77 | 7.40 | 0.83 |
| 6 | 2.92 | 7.39 | 1.38 |

[1]No added iron.
[2]Fe for samples 2 to 6 represents exchanged Fe and trace Fe.

The bimetallic Pt/FeNaY zeolite catalysts were subjected to one of two pretreatment conditions as follows:

Procedure A

The bimetallic zeolites (about 0.2g) were heated from room temperature to 550° C. at a heating rate, of 0.5° C./min in $O_2$, 180 ml/min, and kept at 550° C. for 2 h. These treatments decompose the residual $NH_3$. After purging with He at 550° C. for 1 h, the samples were reduced at 550° C. in $H_2$ for 2 h. After purging again with He for 1 h at the same temperature, the samples were cooled down to room temperature under flowing He and were then ready for the hydrogen chemisorption measurement.

Procedure B

This was generally similar, deviating from A in the temperature program: Calcination and reduction at 360° C., last He purge at 450° C. The $NH_3$ was decomposed.

The uptake of hydrogen was measured by a conventional volumetric method with a Datametric 590 pressure transducer whose references side was evacuated at $10^{-5}$ torr. The H/Pt ratio is conventionally termed as "dispersion." X-ray diffraction of the zeolite samples after thermal treatment was carried out and recorded by means of a Rigaku X-ray diffractometer with Cu K$\alpha$ radiation. The particle size of the Pt was calculated from the X-ray line broadening of the Pt (111) peak at $\partial\theta = 39.8°$.

Results and Discussion

The Fe and Pt contents of six bimetallic zeolite samples were as listed in Table A. Sample 1 contains only a trace of iron in the original NaY zeolite. After the pretreatment procedure (a), the dispersion of Pt is 18% and X-ray diffraction shows that the size of the Pt particles is around 20 nm. Sample 4 contained 1.14 wt % Fe and 7.68 wt % Pt. The atomic ratio of Fe/Pt is 0.51. When pretreatment (a) is applied, the dispersion of Pt is 35% roughly twice the value of the first sample. XRD shows a weak and broad Pt (111) peak which implies a significantly smaller Pt particle size and a lower number of large Pt particles. In sample 6, the amount of Fe was increased to 2.92 wt % and the Fe/Pt ratio is 1.38. In this sample, an even higher dispersion of Pt, viz. 40%, was found and no Pt signal was detected by X-ray diffraction, which proves a very small size of the Pt particles. Data on the dispersion of Pt-Fe bimetallic zeolite samples other than these three are summarized in Table B. The results show that the dispersion of Pt initially increases almost linearly with the amount of added iron.

TABLE B

Hydrogen Chemisorption on (Pt + Fe)/NaY

| Atom Ratio Fe/Pt | H$_2$ Chemisorption H/Pt |
|---|---|
| 0.03 | 0.18 |
| 0.08 | 0.22 |
| 0.31 | 0.30 |
| 0.51 | 0.35 |
| 0.83 | 0.37 |
| 1.38 | 0.40 |

If the bimetallic zeolites were pretreated at a lower temperature as in procedure (B), a dispersion of Pt near 100% was obtained for both Sample Nos. 1 and 6. When treating both samples further at 500° C. in flowing H$_2$, Sample No. 6, which contains 2.92 wt % Fe, maintained a higher dispersion even after 100 h than Sample 1 which contained no added iron.

The following conclusions are indicated. The dispersion is largely controlled by the reduction temperature. If this is low, the Pt atoms migrate slowly through the channels to form Pt particles with sizes near the dimension of the supercage. Hydrogen adsorption results in a H/Pt ratio near 1.0. The further treatment of such small Pt particles at 500° C. in flowing H$_2$ causes a decrease of dispersion down to 65% after 30h. The sintering at this stage probably proceeds by migration of particles rather than individual atoms. The activation energy for the migration of Pt atoms or Pt particles is significantly higher for zeolites containing iron since the dispersion of Pt in Pt/FeNaY zeolites is always higher. The Fe$^{2+}$ ions thus act as a "chemical anchor" as they interact both with Pt and with the zeolite matrix. The latter type of interaction will, at least in part, be due to coulombic interaction of the Fe$^{2+}$ ions with the anionic sites in the matrix.

At higher reduction temperature, the migration of Pt in the absence of an "anchor" is pronounced, resulting in Pt particles as large as 20 nm presumably located at the external surface of the zeolite. Again, in the presence of iron, the migration of the Pt is impeded because of the enhanced interaction with the zeolite. As a result Pt particles remained smaller than 4 nm.

Testing of Catalysts

The bimetal samples prepared as described above were tested as catalysts using gas phase benzene hydrogenation as a test reaction. The Pt/FeNaY zeolites used had been treated by procedure (a) and the catalytic test was performed in a mixing flow reactor at 50° C. and 1 bar (with a partial pressure of benzene of 58 torr). The turnover frequencies showed that the hydrogenation activity was dramatically increased by the Fe content in the bimetallic zeolite catalysts. This increase was even higher than expected on the basis of the enhanced dispersion only. The turnover frequency (TOF) calculated on the basis of the measured H/Pt ratio was found increased by a factor of seven for the Fe containing samples. The TOF value of the Fe-free catalyst 1 was close to the expected literature-based value for Pt/SiO$_2$ at 50° C.[10] (TOF=800±50 molec. site $^{-1}$ hour$^{-1}$).

OTHER EXAMPLES

In other experiments Cr$^{3+}$ and La$^{3+}$ ions were exchanged in NaY and found to impede the agglomeration of Pt and to suppress the Pt particle size at elevated temperature. A Pt/CrNaY zeolite containing 3 wt % Cr and 5 wt % Pt displays a Pt dispersion of 55%, after being treated by procedure (A). This dispersion was even higher than observed in the Pt/FeNaY systems. In analogy to the Pt/FeNaY zeolites, the stabilization effect of La$^{3+}$ on Pt is more pronounced if more La$^{3+}$ ions are present in the zeolite. For instance, the intensity of the XRD peak of Pt (111) was found to decrease by a factor of four when the La content per unit cell increased from 6 to 10 atoms. The loading of Pt in both zeolites is about 4.5wt %.

It can be concluded therefore that multivalent irreducible transition elements and/or lanthamide metal ions, such as Fe$^{2+}$, Cr$^{3+}$ and La$^{3+}$, can increase the interaction of Pt particles with the aluminosolicate framework surface and consequently increase their thermal stability. The transition elements and/or lanthanide metal ions which are electrostatically bounded to the zeolite matrix, interact chemically with the Pt metal particles. It seems likely that this interaction makes use of the incompletely filled d-orbitals of platinum.

In a still further experiment nickel as a catalyst metal together with chromium as the dispersion stabilizing metal was exchanged onto zeolite. Nearly 5 wt. % of Ni is loaded on NaY and Fe/NaY which contains 3 wt. % Fe. Both were heated in Ar at 400° C. for 2 hours before the reduction with H$_2$ at 400° C. for 2 hours was carried out. XRD of Ni/NaY reveals a Ni(III) diffraction peak at $\partial\theta = 44.3°$, but such peak in the XRD of Ni/FeNaY is absent.

We claim:

1. A catalyst comprising a Group VIII metal finely dispersed in a catalytically effective amount on a zeolite catalyst support comprising a porous crystalline aluminosilicate, wherein the improvement comprises having ionically dispersed in said zeolite support a second metal selected from the group consisting of a transition metal other than zinc or a rare earth metal, said second metal being in unreduced ionic form, said Group VIII catalyst metal being in reduced zero valent form, both of said metals while in ionic form having been incorporated in said zeolite support by ion exchange, said unreduced ionic metal having a substantially more negative ion reduction potential than said catalytic metal and being associated in ionic form with the exchange sites of the zeolite, the atomic ratio of said unreduced metal ions to said reduced catalytic metal being at least 0.2.

2. The catalyst of claim 1 in which said catalyst metal is selected from the group consisting of platinum, nickel, cobalt, rhodium, palladium, and iridium.

3. The catalyst of claim 1 or claim 2 in which said unreduced metal ions are selected from the group consisting of iron, chromium, manganese, vanadium, titanium, thorium, neodymium, cerium, lanthanum, and yttrium ions.

4. The catalyst of claim 1, claim 2 or claim 3 in which the atomic ratio of said unreduced metal ions to said reduced catalyst metal is at least 0.5.

5. A catalyst comprising a catalytically effective amount of a metal catalyst dispersed in a zeolite catalyst support comprising a porous crystalline aluminoslicate, said catalyst being selected from the group consisting of platinum, palladium and nickel, wherein the improvement comprises having ionically dispersed in said zeolite support a second metal in unreduced ionic form associated with the exchange sites of the zeolite, said second metal ions being selected from the group consisting of iron and chromium ions, said catalyst metal being in reduced zero valent form, both of said metals while in ionic form having been incorporated in said zeolite support by ion exchange, the atomic ratio of said unreduced metal ions to said catalytic metal being at least 0.5.

6. The catalyst of claim 1 or claim 5 in which said zeolite support is a Y-zeolite and said second metal ions are iron ions.

7. The catalyst of claim 1 or claim 5 in which the difference in reduction potential between said reduced catalyst metal and said unreduced metal ions is at least 0.3 volts.

8. A catalyst comprising a Group VIII metal finely dispersed in a catalytically effective amount on a zeolite catalyst support comprising a porous crystalline aluminosilicate, wherein the improvement comprises also having ionically dispersed in said zeolite support a second metal selected from the group consisting of a transition metal other than zinc or a rare earth metal, said second metal being in unreduced ionic form and said Group VIII catalyst metal being in reduced zero valent form, both of said metals while in ionic form having been incorporated in said zeolite support by ion exchange and thereafter having been subjected to a sequence of oxidation and reduction, said unreduced ionic metal having an ion reduction potential of at least 0.3 volts greater than said catalytic metal, the atomic ratio of said unreduced metal ions to said reduced catlytic metal being at least 0.5.

9. The catalyst of claim 8 in which said unreduced metal ions are selected from the group consisting of iron, chromium, manganese, vandium, titanium, thorium, neodymium, cerium, lanthanum, and yttrium ions, and said zeolite is a Y-zeolite.

10. The catalyst of claim 8 or claim 9 in which said catalyst metal is selected from the group consisting of platinum, nickel, cobalt, rhodium, palladium, and iridium, and said zeolite support is Y-zeolite.

* * * * *